(12) United States Patent
Shiri et al.

(10) Patent No.: US 7,771,343 B2
(45) Date of Patent: Aug. 10, 2010

(54) SYSTEM AND METHOD FOR TREATING CHRONIC PAIN

(75) Inventors: Shimon Shiri, Jerusalem (IL); Zeev Meiner, Jerusalem (IL); Uri Feintuch, Jerusalem (IL); Meir Shahar, Tel-Aviv (IL); Maya Tuchner, Haifa (IL)

(73) Assignee: Hadasit Medical Research Services & Development Company Ltd., Jerusalem (IL)

( * ) Notice: Subject to any disclaimer, the term of this patent is extended or adjusted under 35 U.S.C. 154(b) by 127 days.

(21) Appl. No.: 12/055,964

(22) Filed: Mar. 26, 2008

(65) Prior Publication Data
US 2008/0183030 A1 Jul. 31, 2008

Related U.S. Application Data

(63) Continuation-in-part of application No. PCT/IL2006/001117, filed on Sep. 25, 2006.

(30) Foreign Application Priority Data
Sep. 26, 2005 (IL) .................................. 171097

(51) Int. Cl.
*A61M 21/00* (2006.01)
(52) U.S. Cl. ..................... 600/27; 128/897; 434/258
(58) Field of Classification Search ............ 600/27; 128/897, 922; 434/247, 252, 256, 257, 262; 382/164
See application file for complete search history.

(56) References Cited

U.S. PATENT DOCUMENTS 6,244,987 B1 * 6/2001 Ohsuga et al. .............. 482/4
2003/0125099 A1 7/2003 Basson et al.

OTHER PUBLICATIONS

Brodie, E.E., et al., "Increased motor control of phantom leg in humans results from the visual feedback of a virtual leg." Neuroscience Letters 341 (2003) 167-169.*

(Continued)

*Primary Examiner*—Charles A Marmor, II
*Assistant Examiner*—Carrie Dorna
(74) *Attorney, Agent, or Firm*—Sughrue Mion, PLLC

(57) ABSTRACT

In a method and system for treating pain or impairment a video imaging device obtains image frames of a continuous portion of the patient's body including a selected impaired member in proper spatial relationship to a facial image of the patient. A processor coupled to the imaging device processes the image frames to form composite image frames in substantially real time wherein the impaired member is replaced by a virtual image of a corresponding healthy member so as to depict the imaged portion of the patient's body performing healthy movement of the selected impaired member. An interface is coupled to the processor for controlling virtual movement of the impaired limb in the composite image frames, and a display screen is coupled to the processor for displaying at least some of the composite image frames in substantially real time synchronism with operation of the interface.

13 Claims, 4 Drawing Sheets

OTHER PUBLICATIONS

Lozano, J.A., et al., "VR-Mirror: a virtual reality system for mental practice in post-stroke rehabilitation," Smart Graphics, $5^{TH}$ International Symposium, SG 2005, Proceedings Springer-Verlag Berlin, Germany, 2005, pp. 241-251.

McNeill, M., et al., "Immersive virtual reality for upper limb rehabilitation following stroke," Systems, Man and Cybernetics, 2004 IEEE International Conference on the Hague, The Netherlands Oct. 10-13, 2004, Piscataway, NJ, USA, IEEE, vol. 3, Oct. 10, 2004, pp. 2783-2789.

Ungyeon, Yang, et al., "Just Follow Me: an immersive VR-based motion training system," Proceedings, International Conference on Virtual Systems and Multimedia, Jun. 1, 1999, pp. 435-444.

Hirose, M., et al., "Integrating live video for immersive environments," IEEE Multimedia, IEEE Service Center, New York, NY, vol. 6, No. 3, Jul. 1999, pp. 14-22.

Murray, Craig, et al., "Immersive virtual reality as a rehabilitative technology for phantom limb experience: A Protocol," Cyber Psychology & Behavior, Manchester, United Kingdom, vol. 9, Nov. 2, 2006, pp. 167-170.

* cited by examiner

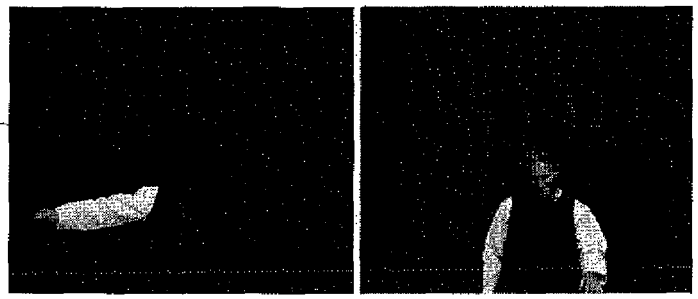
FIG. 2a　　　FIG. 2b
FIG. 3

SYSTEM AND METHOD FOR TREATING CHRONIC PAIN

RELATED APPLICATION

This is a continuation-in-part application of PCT/IL2006/001117 filed Sep. 25, 2006 and claiming priority from IL 171097 filed Sep. 26, 2005.

FIELD OF THE INVENTION

The present invention relates generally to the field of chronic pain, motor impairment and associated disabilities. More particularly, the invention is concerned with a system and a method of using Virtual Reality (VR) to treat chronic pain and associated disabilities, thereby assisting the patient in coping with pain-related fears and avoidance, as well as improving motor function.

PRIOR ART

Prior art references considered to be relevant as a background to the invention are listed below and their contents are incorporated herein by reference. Acknowledgement of the references herein is not to be inferred as meaning that these are in any way relevant to the patentability of the present invention. Each reference is identified by a number enclosed in square brackets and accordingly the prior art will be referred to throughout the specification by numbers enclosed in square brackets.

[1] Jose A. Lozano et al. *VR-Mirror: A Virtual Reality System for Mental Practice in Post-Stroke Rehabilitation* in Smart Graphics 2005 5th International Symposium, XP-002426809 Proceedings Aug. 22-24, 2005.

[2] Craig D. Murray et al. *The treatment of phantom limb pain using immersive virtual reality: Three case studies* in Disability and Rehabilitation, September 2007; 29(18):1465-1469

BACKGROUND OF THE INVENTION

Pain is the most common medical symptom and is a complex phenomenon, involving physiological, emotional, cognitive, cultural, and other variables. The treatment of pain, particularly chronic pain, seems most effective when multidisciplinary approaches are adopted, including pharmacological, physical, cognitive and behavioral elements.

In many respects, chronic pain has plague dimensions, e.g., about 20% of the population experience lower back pain each year. Lower back pain is the most common source of disability among people below the age of 45. Another highly common, chronic problem affecting considerable numbers of the general population is headaches.

Pharmacological analgesics commonly used to relieve pain, especially opioids, have significant negative side effects, such as vomiting, constipation, nausea, respiratory depression, and more. Tolerance is another major problem associated with many types of painkillers. In addition, the over-use of medication has the potential to exacerbate pain, rather than relieving it. The over-use of acute care medication is associated with chronicity and pervasive headaches.

In view of the above problems related to pharmacological therapy for chronic pain, other treatments have been adopted, including bio-feedback techniques, behavioral and cognitive psychotherapies, holistic treatments, and more.

The use of Virtual Reality (VR) for the treatment of pain entails the use of technologies, including computers and various multimedia peripherals, to produce a simulated (i.e., virtual) environment that the user perceives as being comparable to real world objects and events. The user employs specially designed transducers to interact with displayed images, to move and manipulate virtual objects, and to perform other actions in a manner that engenders a feeling of actual presence in the simulated environment. This is accomplished by having the simulation adjust to movements of the user's body, so that the resulting sensory cues correspond to what the user would expect were the patient to perform the same movements in the real world. One of the cardinal features of VR is the user's sense of actual presence in, and control over, the simulated environment.

Until recently, the application of VR technology in rehabilitation was severely limited by the lack of inexpensive, easy-to-use VR systems. The development of VR platforms having more user-friendly software launched a wave of potential applications to medicine, in general, and rehabilitation, in particular. VR is being used in training for surgical procedures, in educating patients and medical students, and in the treatment of psychological dysfunctions, including phobias and eating and body image disorders. It is also used in the rehabilitation of cognitive processes, such as visual perception and executive functions and for training in daily living activities. In addition, VR has been used to improve range of motion, strength, endurance, balance and other impairments.

The representation of body schema is anatomically associated with multiple frontal-parietal networks that integrate data from various body regions and from the surrounding space, in order to allow functional motor performance. Recent evidence suggests that body schema representation is plastic in its nature thus allowing a learning process to occur especially via visual feedback. The absorption of newly received information is followed by changes in specific neural networks, thereby producing an updated body schema eventually leading to reduced pain and/or improved motor control.

Jose A. Lozano et at. [1] describe a virtual reality workbench, referred to as the VR-Mirror, that supports stroke patients with upper-limb hemiplegia in generating motor images. Visual cues are used to evoke powerful imaginative responses that draw the patient's attention to the underlying dynamic structure of a movement. This is done following four consecutive steps:

i. The patient performs a specified motor exercise with the healthy limb so as to as to allow the system to acquire the basic dynamic features of the movement using a tracking device;

ii. The system then displays the mirror image of the movement performed by the unimpaired extremity. The observation of the reflected limb provides a direct perceptual cue of the impaired limb, thus supporting the patient in generating a compelling mental image of the movement;

iii. The patient is then instructed to mentally rehearse the exercise depicted by the screen;

iv. The patient is now invited to replicate the displayed movement using the impaired limb by following the mirror image.

It thus emerges that Lozano et al. [1] simulate healthy movement of an impaired limb in order to stimulate mirror movement by an impaired limb. However, there is no suggestion in [1] to simulate healthy movement of an impaired limb in order to overcome fear-induced pain. Moreover, since Lozano et at. [1] generate simulated movement that is a mirror image of movement of a healthy limb, their approach appears not to be appropriate to those many cases where both of a pair of limbs are impaired or when there is no complementary healthy limb that may be used to generate simulated movement of an impaired limb. Since, as noted above, the most chronic pain for those under the age of 45 is lower back pain for which, of course, no complementary mirror image can be simulated, this appears to be a major drawback of the approach suggested by Lozano et at [1].

Craig D. Murray et al. [2] disclose a system for treating phantom pain due to a missing limb, where a patient wears a head-mounted display (HMD) and a tracker mounted on the counterpart healthy limb. A virtual image is generated showing synthesized movement of the missing limb that mirrors movement of the healthy limb. The virtual image depicts a generic faceless virtual body representation that has limited features and "sees" the world from the same perspective as the patient (i.e., a "first person" view). Substantially the same virtual image is presented for all patients and by definition provides no facial identification with a specific patient.

However, even beyond the versatility of prior art approaches, the present inventors base their approach on evidence suggesting that identification of the patient with the displayed image impacts greatly on the effectiveness of the system due to the increasing sense of presence experienced by the patient. Specifically, there is a psychological component whereby a patient who is able to identify closely with the displayed image is better able to imagine himself following the trajectory of the mirror image: and this represents a marked improvement over known systems.

It would therefore be desirable to increase the sense of identification of the patient to the displayed image in virtual reality systems for the treatment of pain and impairment.

Furthermore, as suggested by accumulated evidence, seeing an image of oneself would activate regions in the brain, known as "mirror neurons", expected to be involved in learning and regaining motor abilities of impaired organ. Thus the present system differs significantly in clinical rationale and implementation from prior art.

SUMMARY OF THE INVENTION

The present invention provides a VR system that enhances both the representations of body schema and body image, by presenting patients with cognitive-perceptual stimuli empowering their disturbed body representations. Since these representations are characterized by plasticity, new information has the potential of changing and possibly enhancing the body schema and body image.

The system of the present invention also implements exposure therapy (VRET) to reduce pain-related fears and avoidance. Pain-related fears appear to be essential in the development of various types of chronic pain. In addition, pain-related fears are associated with passive coping, a strong and independent predictor of disability. Patients with high levels of fear of pain report greater disability, a more depressed mood, greater severity of pain, and lower treadmill performance. Reductions in fear/avoidance beliefs regarding work and physical activity are associated with reductions in disability.

The present invention uses VR to reduce pain-related fears. Previous studies indicate that VR techniques are efficient in coping with different fears and phobias. The novel system of the present invention allows patients being treated to watch themselves interacting and performing various actions that they previously avoided because of pain, pain-related fear, or pain-related disability. For example, patients who avoid moving their arms due to chronic arm pain, such as those suffering from CRPS-I or post-stroke chronic shoulder/arm pain, can watch themselves moving the affected arm/leg/back/shoulder, etc. just by moving a finger to activate the interface. Similarly, patients with lower back pain, neck pain, fibromyalgia or other chronic pain syndromes who avoid various movements such as bending or lifting objects, can watch themselves performing these previously avoided movements/activities just by pressing a key or moving a computer mouse.

Viewing oneself executing previously avoided movements or behaviors may have an especially potent effect, since viewing oneself activates the right limbic, left prefrontal cortex and superior temporal cortex, while viewing other familiar objects activates only portions of the right limbic system (right insula). The activation of limbic-cortical structures allows the integration of effect and cognition.

Patients who are treated with the system of the present invention look at the computer screen or projection, where they see themselves performing tasks in a virtual environment.

A major difference between the above-mentioned systems and other similar systems and the system of the present invention is the underlying principle of operation. In typical applications, the patient must physically move the impaired limb. A main component of the system and method according to the present invention is the fact that the patient does not have to move the impaired limb, but rather controls it by a mediating interface, causing the patient's virtual representation to perform the task. In other words, the therapeutic goal of the present invention is based on altering the patient's body schema, without moving the entire affected limb. The more similar the virtual image is to the actual patient, the more he can identify with his own self-image and the more pronounced is the feedback that stimulates the patient to mimic the image and imitate the movement of the virtual limb with his impaired limb.

A further consideration is that in hitherto-proposed approaches such as that described by Lozano et al. [1], only the mirror image of the impaired limb is displayed. It has been found that self-face recognition causes a unique pattern of brain activity, including mirror neurons that favor whole body display images.

Furthermore, in the invention the patient activates the virtual limb using his or her impaired limb, small movements of which induce the full range of healthy movements of the virtual limb. This establishes a cause and effect relationship between the patient's activity and the virtual representation. This facilitates control of the virtual limb in contrast to the approach disclosed by Lozano et al. [1], where the patient merely imitates the movements of the virtual limb but does not control it.

It is therefore a broad object of the present invention to provide a system and a method for treating chronic pain, motor impairment and associated disabilities by enhancing body representation and using VRET to reduce pain-related fears and avoidance as well as improving motor function.

In accordance with a first aspect of the present invention there is provided a system for treating pain or impairment in a member of a patient's body, the system comprising:

a video imaging device for obtaining image frames of a continuous portion of the patient's body including a selected impaired member in proper spatial relationship to a facial image of the patient, a processor coupled to the imaging device for processing the image frames to form composite image frames in substantially real time wherein the impaired member is replaced by a synthetic image of a corresponding healthy member so as to depict said portion of the patient's body performing healthy movement of the selected impaired member, an interface coupled to the processor for controlling movement of the impaired limb in the composite image, and a display screen coupled to the processor for displaying at least some of the composite image frames in substantially real time synchronism with operation of said interface.

According to a second aspect, the invention provides a method for treating pain and/or motor impairment in a member of a patient's body, the method comprising:

obtaining image frames of a continuous portion of the patient's body including a selected impaired member in proper spatial relationship to a facial image of the patient;

processing the image frames to form composite image frames in substantially real time wherein the impaired member is replaced by a synthetic image of a corresponding healthy member so as to depict said portion of the patient's body performing synthesized healthy movement of the selected impaired member;

using an interface to control virtual movement of the impaired member in the composite image, and displaying at least some of the composite image frames in substantially real time synchronism with operation of said interface.

In accordance with a third aspect of the present invention there is provided a system for treating pain and/or motor impairment experienced by a patient, the system comprising:

a video imaging device for obtaining a movie of the patient including movement of at least one healthy limb in a pair of limbs of which one is impaired and one is healthy;

a processor coupled to the imaging device and adapted to generate composite image frames by:

distinguishing between said pair of limbs and a remainder of a patient's body based on color attributes associated with said pair of limbs and contrasting color attributes associated with the remainder of the patient's body;

determining a first boundary between the healthy limb of said pair and the remainder of the patient's body;

determining a second boundary between the impaired limb of said pair and the remainder of the patient's body;

capturing movement of the healthy limb bound by said first boundary; and replacing images of the impaired limb in said movie with matching mirror images of the healthy limb;

a display screen coupled to the processor for displaying the composite image frames, and an interface coupled to the processor for controlling the movement of the impaired member in the composite image frames.

According to a fourth aspect, the invention provides a method for treating pain and/or motor impairment experienced by a patient in an impaired limb, the method comprising:

capturing a movie of the patient including movement of at least one healthy limb is in a pair of limbs of which one is healthy and one is the impaired limb to be treated;

distinguishing between said pair of limbs and a remainder of a patient's body based on color attributes associated with said pair of limbs and contrasting color attributes associated with the remainder of the patient's body;

determining a first boundary between the healthy limb of said pair and the remainder of the patient's body;

determining a second boundary between the impaired limb of said pair and the remainder of the patient's body;

capturing movement of the healthy limb bound by said first boundary;

replacing images of the impaired limb in said movie with matching mirror images of the healthy limb so as to generate respective composite images;

controlling movement of the impaired limb in the composite images; and displaying the composite images responsive to controlled movement of the impaired limb in the composite images.

BRIEF DESCRIPTION OF THE DRAWINGS

The invention will now be described in connection with certain embodiments with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a block diagram illustrating an embodiment of a system for treating chronic pain;

FIGS. 2a and 2b illustrate image frames of a patient showing selective members of the body during an initial calibration process;

FIG. 3 illustrates an image frame of a patient showing selective members of the body in VR; and FIGS. 4 and 5 are flow diagrams showing the principal operations carried out by the system according to different embodiments of the invention.

DETAILED DESCRIPTION OF EMBODIMENTS

Figure 1:
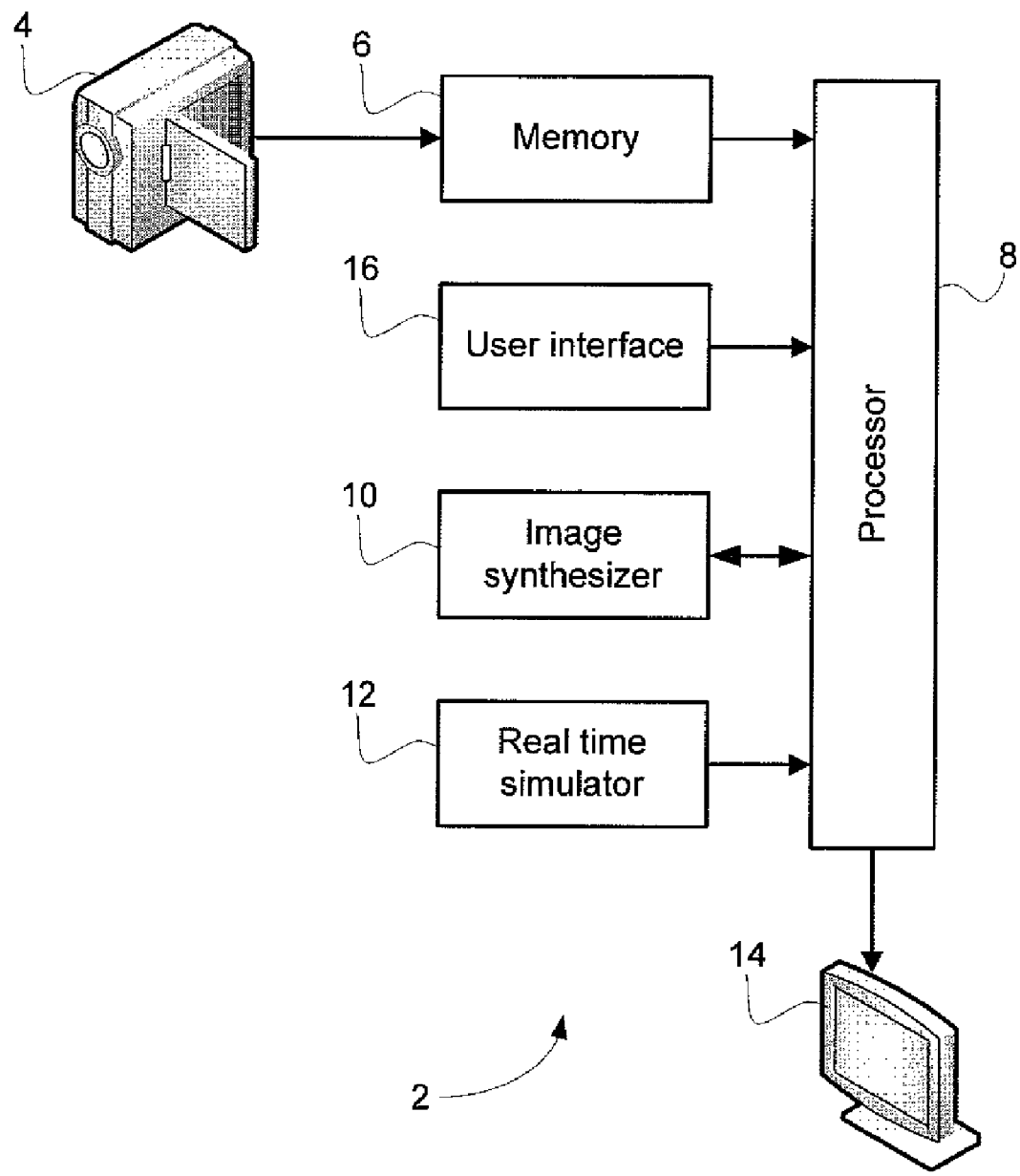

FIG. 1 shows schematically a system 2 for treating chronic pain and/or impairment. The system 2 includes a video camera 4 (constituting a video imaging device) that captures successive image frames of a patient's body or selected portion(s) thereof. The image frames are stored in a memory 6 coupled to a processor 8. The processor 8 processes the image frames for forming a virtual representation of the entire or selected portion of the patient's image. The output from the processor 8 is fed to an image synthesizer 10 for generating new video image frames, possibly 3D images, which are fed into a real time simulator 12 coupled to a display screen 14. The video images may be formed by recording a movie clip of the patient showing full movement of a healthy limb and may be conveyed over a communications network using video streaming or other known techniques. The processor 8 processes image frames as described in further detail below, to identify the impaired limb and replace the impaired limb in each processed image frame with a corresponding virtual image depicting a healthy limb so as to create a composite image which superimposes synthetic motion of the impaired limb on the real time streaming video frame of the patient. There is also provided an interface 16, e.g., a computer mouse, buttons or a joystick, facilitating controlling the capturing of the patient's image, creating virtual representations and operating the virtual activities, namely, movements of the displayed virtual members or portions of the patient's body. It will be understood that while the image synthesizer 10 and the real time simulator 12 are shown as discrete units, their functionality may be realized by the processor 8 which may be a suitably programmed computer.

Prior to use, the system 2 must be first be calibrated. This is typically a one-time only process that must be performed for each patient and possibly for different limbs of each patient. In order to explain how the system may be used for maximum versatility, there will now be described a process that allows different movements of a specific limb, e.g. an arm, to be calibrated so as to allow subsequent generation and storage of matching mirror sequences that may later be used to replace successive virtual positions of a corresponding impaired limb.

FIGS. 2a and 2b illustrate images of a patient showing selective members of the body during the calibration process. An impaired limb, in this case the right arm being one of a pair of limbs one of which (i.e. the left) is healthy and the other (i.e. the right arm) impaired, is isolated from the remaining body of the patient by means of his wearing clothing on both arms of a contrasting color or hue to that of the remaining body portions, e.g. the head and upper torso. Thus, as shown in the figure, the patient wears generally dark clothing to contrast with the light sleeves that cover his arms and whose intersections with the dark clothing on opposing shoulders create respective boundaries that allow isolation of the respective limbs in each pair. It is to be noted that the hands are not covered, but since they are of different color or hue to the background, they are distinguishable and may thus be associated with the respective arms to which they are attached. It should be noted that the clothing merely serves to demarcate the respective boundaries of the limbs with the remainder of the body to which they are attached, so as to allow the replacement in the composite image frames of the impaired limb by the matching mirror images of the healthy limb. When depicting arm movement, for example, the same effect can be achieved by wearing a vest whose shoulder straps serve as the required boundaries.

During the calibration process, the patient undertakes a specified movement of his healthy limb. For example, he might raise his left arm, or rotate it or throw something with it or attempt to catch something with it or undertake any other required movement. For each different movement, a corresponding sequence of image frames is captured and from each image frame a matching mirror image is generated and stored in memory. This effectively creates a library of mirror image sequences each corresponding to a specific movement of the healthy limb and each containing multiple mirror image frames corresponding to an instantaneous image frame of the healthy limb.

In FIG. 2b the patient sees himself in normal video streaming just like in a regular webcam, so he gets to see what he does. He is asked to raise his healthy arm, which he sees in the window shown in FIG. 2b. Upon doing this, the "cut off" healthy arm is shown in FIG. 2a performing this whole aforementioned movement but detached from the rest of the body. This is presented just for the sake of the clinician to allow him to verify "quality control" of the system, by establishing that it did not inadvertently crop extra parts of the body. This part of the calibration can be omitted once it is established that the system is operating properly. In this example the impaired hand is the right hand and the patient raises his left healthy arm. The patient sees himself as though he is looking in a mirror so that his impaired right limb appears as the left limb in the composite image.

The interface may also be calibrated to map the complete sequence of image frames to extremes of the interface. By way of example, the interface may include a joystick that is moved by the patient or practitioner and whose successive instantaneous positions cause a respective image frame to be extracted from the memory. By such means, the complete range of movement of the joystick causes display of the complete movie each of whose frames is displayed in accordance with an instantaneous position of the joystick. In such an embodiment, operating the joystick quickly will effectively increase the speed of the video and vice versa. It allows also for a controlled partial movement depending on the patient's intentions and movement of interface.

FIG. 3 illustrates an image frame of the patient showing selective members of the body in VR during actual use of the system after calibration. The patient or medical practitioner operates the user interface so as to induce a selected movement of the healthy limb. The selected movement may be predetermined or may be user-selectable via the interface. In either case, operation of the interface generates a position signal at successive instantaneous positions of the healthy limb that are mapped to a matching mirror image frame in the mirror image library that corresponds to the selected movement. Thus, in the case where a joystick serves to scroll through successive image frames, for successive image frames of the healthy limb corresponding to each position of the joystick, the matching mirror image frame is extracted from the mirror image library and stitched into the current image in place of the impaired limb. This may be done by determining in near real time a boundary between the impaired limb and the remainder of the imaged portion of the patient's body in the current image frame and replacing the impaired limb in the current image frame with matching mirror image of a healthy limb so that the boundary of the mirror image overlays the boundary between the impaired limb and the remainder of imaged portion. By such means, a composite video image is created that depicts the patient performing the selected movement with his impaired limb and that shows a continuous portion of the patient's body that includes the impaired limb in proper spatial relationship to the facial image of the patient. If desired, other image data may be integrated into the composite frames, such as a background scene, animation effects and so on. The composite image is an integration of the original image frame showing the patient in streaming video, but wherein the impaired limb is replaced by the respective mirror image of the healthy limb. This provides very strong feedback since the patient sees himself in substantially real time as though he is carryout out physical activities with his impaired limb. Any other action carried out by the patient such as head movement, facial reaction and so on is captured in real time and is maintained in the composite image.

The feedback provided by the synthetic self image exhibiting healthy behavior is very strong and facilitates neurophysiological and psychological processes leading to rehabilitation of the impaired limb.

Thus, the whole imaged portion of the body is streamed online and is presented on the screen. The real impaired organ (right hand in this example) is not shown and is replaced by the virtual arm based on the mirror image of the healthy hand acquired during the calibration process. Since the sleeves and torso are of distinct colors, the system knows where to remove the impaired arm and where to attach the virtual arm to the physical body and it does so continuously online. The rest of the body—face, healthy arm etc. are streamed online. When the patient succeeds in picking the apple and he smiles, he will see it online. If he moves his healthy arm i.e. his left arm in this example and scratches his nose, he will see it online. However since we focus on the impaired limb there is no need to ask him to perform any tasks with this healthy arm and so it simply hangs loose most of the time.

For motivational as well as neurophysiological purposes, these tasks may be game-like. For example, in the VR environment, the patient may play the part of a goal keeper stopping soccer balls. In such a game, whenever a virtual ball approaches the patient, the patient will lift his/her arm to block it. The patient sees him/herself on the screen performing that very action, lifting his/her arm and stopping the ball. The system amplifies the patient's minute motion and translates it into a full movement in the virtual environment. It is anticipated that, over time, the patient will develop a sense of presence and identify with his/her virtual representation moving freely in the virtual environment.

Hence, a patient located in front of the video camera 4 and the display screen 14 sees him/herself and manipulates the interface 16 to move the portion of the body which is displayed as a virtual image. The patient can thus control the virtual representation and translate a small finger/wrist movement into a healthy full range movement of the virtual image and watch him/herself performing various activities previously avoided because of actual pain experienced or due to pain-related fears or limited motor control.

Figure 4:
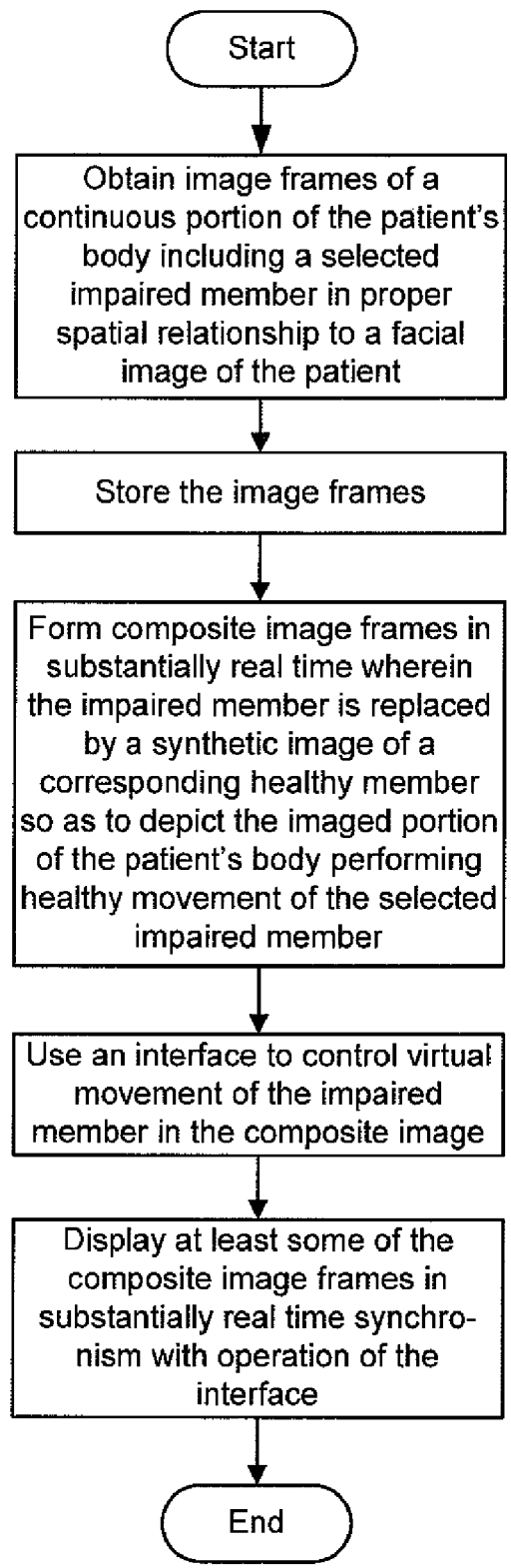
Figure 5:
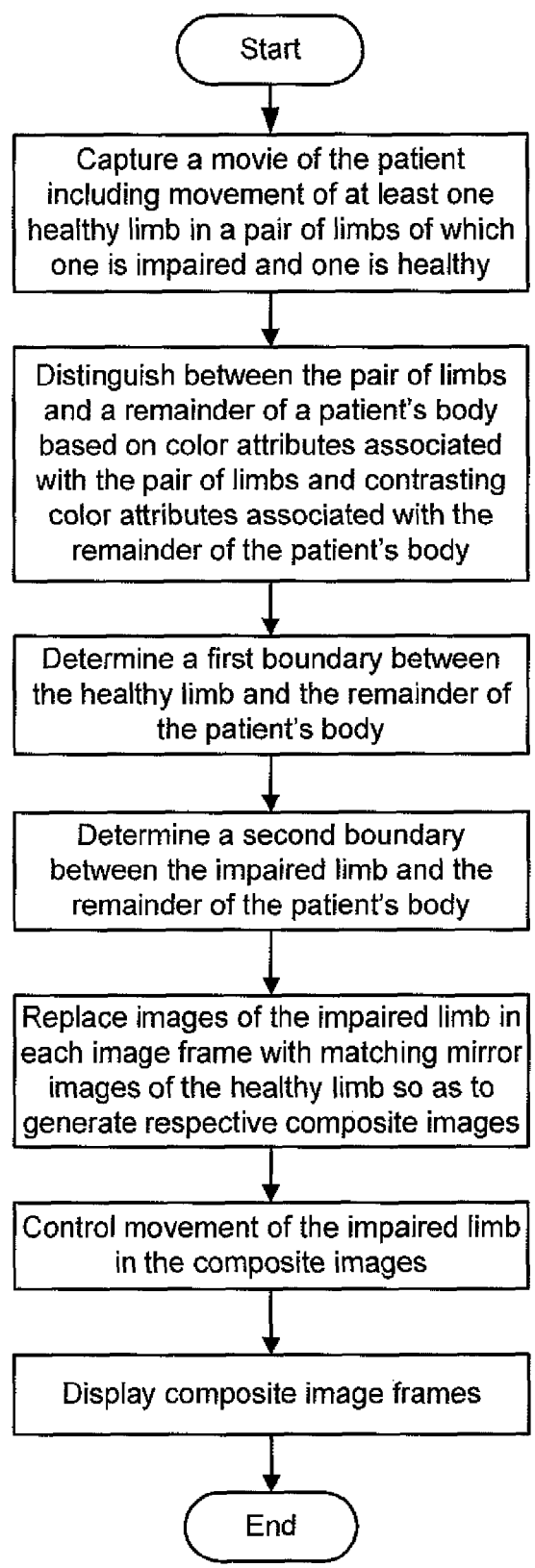

FIGS. 4 and 5 are flow diagrams showing the principal operations carried out by the system according to different embodiments of the invention. Thus, FIG. 4 relates to an embodiment where identification with the virtual image is enhanced by displaying facial features of the patient at the same time as mirror movement of the impaired limb. In accordance with such an embodiment, the video camera 4 obtains image frames of a continuous portion of the patient's body including a selected impaired member in proper spatial relationship to a facial image of the patient.

The processor X processes the image frames to form virtual image frames in substantially real time wherein the impaired member is replaced by a synthetic image of a corresponding healthy member so as to create a composite image frame depicting the imaged portion of the patient's body performing healthy movement of the selected impaired member. The interface allows the virtual movement of the impaired limb in the composite image to be controlled whereby the composite image frames are displayed in substantially real time synchronism with operation of the interface.

FIG. 5 relates to an embodiment where the imaging device captures a movie of the patient including movement of at least one healthy limb in a pair of limbs of which one is impaired and one is healthy. In this embodiment, the processor is adapted to distinguish between the pair of limbs and a remainder of a patient's body based on color attributes associated with the pair of limbs and contrasting color attributes associated with the remainder of the patient's body. The images frames are processed in real time to determine a first boundary between the healthy limb and the remainder of the patient's body and to determine a second boundary between the impaired limb and the remainder of the patient's body. Movement of the healthy limb bound by the first boundary is captured and the corresponding images of the impaired limb in each image frames are replaced by matching mirror images of the healthy limb.

It will be understood that the term "color attribute" refers to any color property that allows differentiation between the impaired limb and other limbs and can, for example, include colors, hue, grey shade, patterns and so on.

It should also be noted that reference is made in the description and claims to "substantially real time" only because it obviously takes a non-zero time to buffer each image frame and generate and display the corresponding synthetic frame. To all practical intents and purposes, certainly so far as the patient is concerned, the synthetic frames are generated and displayed in real time.

It has already been noted that the invention is also effective in synthesizing healthy movement of organs that are not impaired. For example, in an embodiment that is dedicated to inducing positive images to a patient suffering from lower back pain, it is obviously not possible to replace instantaneous images of the lower back with mirror images of a matching healthy limb of the same patient. However, similar principles may be applied whereby the synthetic image of a corresponding healthy member is derived from a healthy specimen or is even animated so as to create a library of matching image frames each corresponding to a respective instantaneous position of the interface and which may be extracted in real time and stitched into the current image in place of the unhealthy organ so as to generate successive composite image frames.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

It will also be understood that the system according to the invention may include a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A system for treating pain or impairment in a member of a patient's body, the system comprising:
    a video imaging device for obtaining image frames of a continuous portion of the patient's body including a facial image of the patient and a selected impaired member in proper spatial relationship to the facial image of the patient,
    a processor coupled to the imaging device for processing the image frames to form composite image frames that include the facial image of the patient in substantially real time wherein the impaired member is replaced by a synthetic image of a corresponding healthy member so as to depict said portion of the patient's body performing healthy movement of the selected impaired member,
    an interface coupled to the processor for controlling movement of the impaired limb in the composite image, and
    a display screen coupled to the processor for displaying at least some of the composite image frames in substantially real time synchronism with operation of said interface.

2. The system according to claim 1, wherein said interface is selected from the group of a computer mouse, a button, a joystick, or a combination thereof.

3. The system according to claim 1, wherein the processor includes an image synthesizer.

4. The system according to claim 1, wherein the interface is responsive to motion induced by the patient for controlling movement of the impaired member in the composite image frames.

5. A computer implemented method for treating pain or motor impairment in a member of a patient's body, the method comprising:

obtaining image frames of a continuous portion of the patient's body including a facial image of the patient and a selected impaired member in proper spatial relationship to the facial image of the patient;

processing the image frames to form composite image frames that include the facial image of the patient in substantially real time wherein the impaired member is replaced by a synthetic image of a corresponding healthy member so as to depict said portion of the patient's body performing synthesized healthy movement of the selected impaired member;

using an interface to control virtual movement of the impaired member in the composite image, and displaying at least some of the composite image frames in substantially real time synchronism with operation of said interface.

6. The method according to claim 5, wherein controlling movement of the impaired member in the composite image is effected by means of an interface actuatable by the patient.

7. The method according to claim 5, for use in assisting the patient in coping with pain-related fears and avoidance.

8. The method according to claim 5, wherein a computer generates said synthetic image by:

distinguishing between the impaired limb and a remainder of the imaged portion of the patient's body in a current image frame based on color attributes associated with the impaired limb and contrasting color attributes associated with the remainder of the imaged portion;

determining a first boundary between the impaired limb and the remainder of imaged portion of the patient's body in the current image frame;

obtaining a mirror image of a healthy limb that matches the image of the impaired limb in the current image frame; and replacing the impaired limb in the current image frame with matching mirror image of a healthy limb.

9. The method according to claim 8, wherein obtaining a mirror image of a healthy limb includes:

capturing at least one video sequence depicting a corresponding movement of the healthy limb;

for each image frame in the at least one video sequence creating a matching mirror image; and storing the matching mirror image.

10. The method according to claim 8, wherein the color attribute is associated with clothing worn by the patient.

11. The method according to claim 8, wherein obtaining a mirror image of a healthy limb includes:

determining an instantaneous position of the healthy limb based on signals generated by the interface; and selecting a pre-stored mirror image of a healthy limb having a position matching the instantaneous position of the healthy limb.

12. A program storage device readable by machine, tangibly embodying a program of instructions executable by the machine to perform a method for treating pain or motor impairment in a member of a patient's body, the method comprising:

processing image frames of a continuous portion of the patient's body including a facial image of the patient and a selected impaired member in proper spatial relationship to the facial image of the patient to form composite image frames that include the facial image of the patient in substantially real time wherein the impaired member is replaced by a synthetic image of a corresponding healthy member so as to depict said portion of the patient's body performing synthesized healthy movement of the selected impaired member; and displaying at least some of the composite image frames in substantially real time synchronism with controlled virtual movement of the impaired member in the composite image.

13. A system for treating pain or impairment in a member of a patient's body, the system comprising:

a video imaging device for obtaining image frames of a continuous portion of the patient's body including a selected impaired member in proper spatial relationship to a facial image of the patient, an interface for controlling movement of the impaired limb in the composite image, and a processor coupled to the interface and the video imaging device for processing the image frames to obtain a mirror image of a healthy limb that matches the image of the impaired limb in a current image frame by determining an instantaneous position of the healthy limb based on signals generated by the interface, selecting a pre-stored mirror image of a healthy limb having a position matching the instantaneous position of the healthy limb and forming composite image frames that include the facial image of the patient in substantially real time by replacing the impaired limb by a synthetic image of a corresponding healthy member so as to depict said portion of the patient's body performing healthy movement of the selected impaired member, and a display screen coupled to the processor for displaying at least some of the composite image frames in substantially real time synchronism with operation of said interface.

* * * * *